No. 779,835. PATENTED JAN. 10, 1905.
T. A. BOYD.
SPINDLE AND BEARING.
APPLICATION FILED JAN. 15, 1904.
2 SHEETS—SHEET 1.
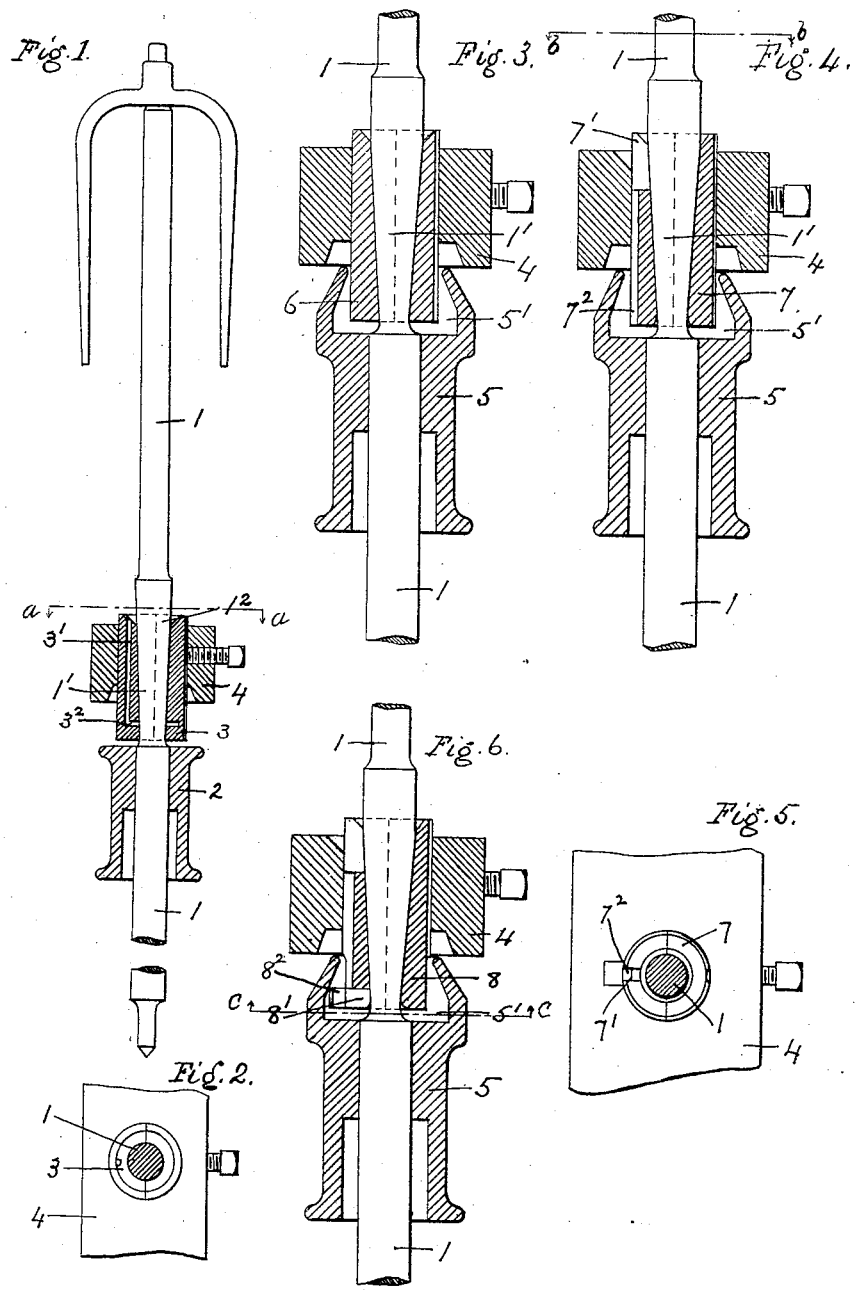
WITNESSES
F. W. Wright,
Walter Abbe
INVENTOR
Thomas Alexander Boyd
BY
Howson and Howson
ATTORNEYS No. 779,835. PATENTED JAN. 10, 1905.
T. A. BOYD.
SPINDLE AND BEARING.
APPLICATION FILED JAN. 15, 1904.
2 SHEETS—SHEET 2.
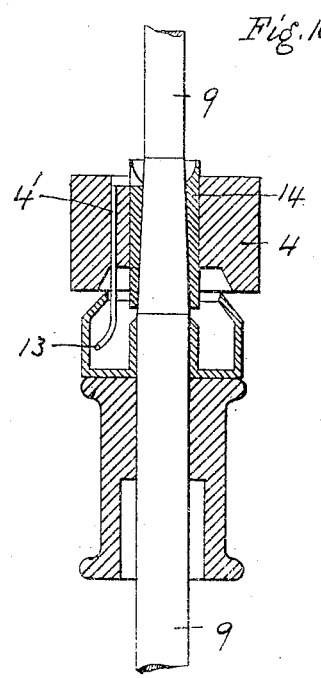
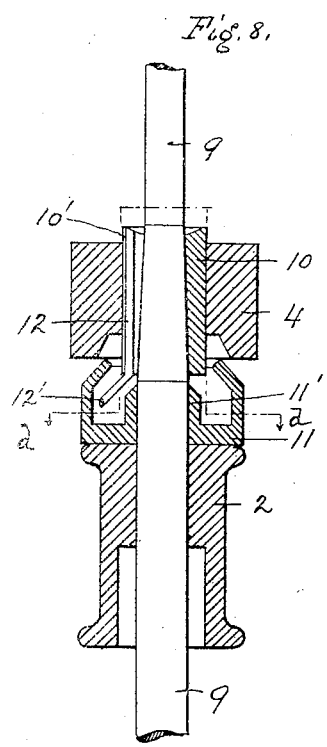
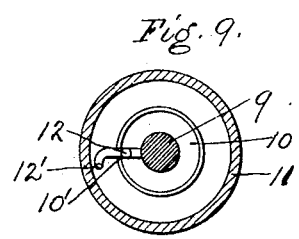
WITNESSES
F. W. Wright
Walter Abbs
INVENTOR
Thomas A. Boyd
BY
Howson and Howson
ATTORNEYS No. 779,835.

Patented January 10, 1905.

UNITED STATES PATENT OFFICE.

THOMAS A. BOYD, OF GLASGOW, SCOTLAND.

SPINDLE AND BEARING.

SPECIFICATION forming part of Letters Patent No. 779,835, dated January 10, 1905.

Application filed January 15, 1904. Serial No. 189,178.

*To all whom it may concern:*

Be it known that I, THOMAS ALEXANDER BOYD, a subject of the King of Great Britain and Ireland, and a resident of Glasgow, county of Glasgow, Scotland, have invented Improvements in Spindles for Spinning and Analogous Machines, of which the following is a specification.

My invention relates to spinning and analogous spindles which are supported in a footstep and a bearing placed above the wharve, or the point at which the spindle is driven, and has for its object improvements in the means of lubrication of the bearings and in the means of protecting them from dust.

In the accompanying drawings, Figures 1 and 2 show a spindle with inverted conical neck or bearing. Fig. 3 shows a similar spindle, but with oil-cup in wharve. Figs. 4 and 5 show a spindle with oil-cup and with bush having an oil-return means. Figs. 6 and 7 show spindle with bush constructed to convey the oil to the spindle. Figs. 8 and 9 show loose oil cup and tube to carry oil to top of spindle-bearing. Fig. 10 shows spindle and oil-tube.

The first part of my invention consists of a conical bearing formed upon the spindle above the wharve and having the said conical bearing with its larger diameter uppermost, so as to lift or retain the oil in the bearing by the revolving of the spindle. This part of my invention also includes a spindle-bush so arranged as to convey the oil from the top to the lower part of the bush and to deliver it against the smaller end of the conical bearing of the spindle. In carrying out this part of my invention, Figs. 1 and 2, I employ a spindle 1, having a bearing 1' above the wharve 2, formed conically and having the large diameter of the said conical bearing uppermost. The conical bearing 1' works in a bush 3, which is carried in a spindle-rail 4. As the spindle 1 revolves the oil tends toward the larger diameter $1^2$ of the bearing, which is at the upper end. The bearing will thus better retain its oil. In another modification of this part of my invention I bore a hole 3' vertically through the bush 3 to an annular groove $3^2$ at the lower end of the bearing. The bush is countersunk at its upper end to receive the oil, which flows to the lower end of the bush through the oil-hole referred to or onto the spindle-bearing. As the oil comes in contact with the spindle-bearing at its lower end it is drawn upward and is thus made to circulate. The bushes 3 are made in halves, so that they may be placed on the spindles and passed into the spindle-rail 4.

The second part of my invention relates to the combination of a spindle with a conical bearing and bush above the wharve, the larger diameter of the conical part being uppermost, with an oil-cup fixed on the spindle at the lower end of the bearing for the purpose of receiving any oil that may flow from the bearing and of supplying oil to the bearing. In carrying out this part of my invention in one arrangement, Fig. 3, I form on a spindle 1 a conical bearing 1' above the wharve 5. On this bearing I place a bush 6, held in the spindle-rail 4. Below the bearing 1' and above the wharve 5 and bush 6 I fix on the spindle an oil-cup 5', which surrounds the lower end of the bush. I form this oil-cup wider at its bottom than at its top, so as to retain the oil while the spindle is running. When the spindle is stopped for piecing or doffing or otherwise, the oil which by centrifugal force when in motion is kept away from the spindle flows around the spindle and leaves on it and in the bearing a sufficient supply to be drawn up by the conical bearing to the top of the bush. Oil poured in at the top of the bush is also kept from flowing downward, as it would do were the bearing parallel or with the larger diameter of the conical part formed at the lower end.

The third part of my invention relates to a spindle with conical bearing and oil-cup, as described in the foregoing second part of my invention, but in combination with a bush arranged to return the oil which is drawn to the upper end of the bearing to the oil-cup otherwise than through the bearing itself for the purpose of causing the oil to circulate. In carrying out this part of my invention in one arrangement, Figs. 4 and 5, I employ a spindle 1 and an oil-cup 5', as described in the second part of my invention in combination with a bush 7, having a horizontal groove 7' from the upper end of the bearing to the outside of the bush, and a vertical groove 7² at the outer end of the horizontal groove. The oil drawn up from the oil-cup 5', and which overflows, passes by means of the grooves described back to the oil-cup.

The fourth part of my invention relates to spinning-spindles having parallel or conical bearings and bushes above the wharves and oil-cups loose or fixed on the spindles below the said bearing arranged so that the revolving of the oil-cup shall force the oil up through the spindle-bearing or up to the top of the bush. In carrying out this part of my invention in one arrangement, Figs. 6 and 7, I employ a spindle 1 with a wharve 5 and an oil-cup 5', as previously described, and a bush 8. At the lower end and outside of the bush 8 I cut a groove 8', pointing inward and upward into the spindle-bearing. At the side of this oil-hole I fix a strip of steel 8², which projects almost to the inner wall of the oil-cup 5'. This steel strip is curved and fixed, so that the oil in the oil-cup shall by the revolution of the spindle be swept inward to the oil-hole at the lower end of the bush. The oil is thus forced up through the bearing and overflows and returns to the oil-cup by a groove on the top and outside of the bush. In a second arrangement of this part of my invention, Figs. 8 and 9, I employ a spindle 9 with a bush 10, supported in a spindle-rail 4. On the spindle 9 I place above the wharve 2 an oil-cup 11, made so as to be easily removable for cleaning. This oil-cup 11 is preferably driven frictionally. I form the oil-cup with a boss 11' inside and surrounding the spindle. This boss 11' rises from the bottom of the oil-cup 11 sufficiently high to insure holding a supply of oil whether the spindle is in motion or standing. At the front side of the bush I cut a groove 10', vertical by preference. Into this groove I insert a tube 12, which passes from the upper part of the bush down into the oil-cup. The lower end 12' is bent outward and has its opening facing the revolving oil, so as to allow the oil-cup 11 to force the oil up the tube to the upper end of the bush. The oil in being discharged flows down between the spindle 9 and the bush 10. Any excessive supply of oil finds its way down the groove 10' in which the tube 12 is placed. In a third arrangement, Fig. 10, I bore a hole 4' in the spindle-rail 4 and insert a tube 13 at the lower end of the hole. This tube 13 conveys the oil up through the rail 4 to the upper end of the bush 14, and thus lubricates the spindle.

Having now particularly described and ascertained the nature of my said invention and in what manner the same is to be performed, I declare that what I claim is—

1. In spinning and analogous machines the combination of a spindle and wharve thereon, the spindle having a neck above the wharve formed conically and with the largest diameter of the cone at the upper end, and a bush in which the conical part of the spindle has its bearing, as and for the purpose described.

2. In spinning and analogous machines the combination of a spindle and wharve thereon, the spindle having a neck above the wharve formed conically and with the largest diameter of the cone at the upper end, and a bush in which the conical part of the spindle has its bearing, and an oil-cup at the lower end of the spindle-neck.

3. In spinning and analogous machines the combination of a bush, spindle and an oil-cup on the spindle, with means for forcing the oil by the revolution of the oil-cup against the spindle at the lower end of the spindle-bush.

4. In spinning and analogous machines, the combination of a bush, spindle and an oil-cup on the spindle, with a fixed tube having a bent end for forcing the oil upward to the upper part of the bush by the revolution of the oil-cup.

In testimony whereof I have signed my name to this specification in the presence of two subscribing witnesses.

T. A. BOYD.

Witnesses:
H. A. BOYD,
R. H. BOYD.